(12) United States Patent
Shudark et al.

(10) Patent No.: US 10,278,173 B2
(45) Date of Patent: Apr. 30, 2019

(54) SELECTING A PARENT NODE IN A TIME-SLOTTED CHANNEL HOPPING NETWORK

(71) Applicant: Landis+Gyr Innovations, Inc., Alpharetta, GA (US)

(72) Inventors: Jeffrey Shudark, Cumming, GA (US); James Patrick Hanley, Decatur, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 163 days.

(21) Appl. No.: 15/364,947

(22) Filed: Nov. 30, 2016

(65) Prior Publication Data

US 2017/0156144 A1  Jun. 1, 2017

Related U.S. Application Data

(60) Provisional application No. 62/261,046, filed on Nov. 30, 2015.

(51) Int. Cl.
*H04W 4/80* (2018.01)
*H04W 8/00* (2009.01)
(Continued)

(52) U.S. Cl.
CPC ......... *H04W 72/0446* (2013.01); *H04W 4/80* (2018.02); *H04W 8/005* (2013.01);
(Continued)

(58) Field of Classification Search
CPC ............................ H04W 72/1257; H04L 29/06
(Continued)

(56) References Cited

U.S. PATENT DOCUMENTS

| 5,400,338 A | 3/1995 | Flammer, III |
| 9,148,197 B1 | 9/2015 | Hartman |

(Continued)

FOREIGN PATENT DOCUMENTS

WO    2017095882    6/2017

OTHER PUBLICATIONS

IEEE Standard for Low-Rate Wireless Personal Area Networks (WPANs), Draft IEEE P802.15.4-REVc/D00-BTM, Oct. 5, 2015, 761 pages.

(Continued)

*Primary Examiner* — Iqbal Zaidi
(74) *Attorney, Agent, or Firm* — Kilpatrick Townsend & Stockton LLP

(57) ABSTRACT

Systems and methods are disclosed for selecting a parent node in a time-slotted channel hopping ("TSCH") network. A method can include synchronizing, by a low-energy node, communications with a channel hopping pattern of a primary TSCH network. The method can further include transmitting, by the low-energy node, a selection-phase enhanced beacon request that requests an enhanced beacon from TSCH nodes with availability to accept children and with at least a specified link quality using the synchronized communications. The method can further include receiving, by the low-energy node, a selection-phase enhanced beacon from a TSCH node. The method can further include transmitting, by the low-energy node, an adoption request to the TSCH node. The method can further include receiving, by the low-energy node, an adoption response from the TSCH node indicating the TSCH node is managing the primary TSCH network join on behalf of the low-energy node.

20 Claims, 8 Drawing Sheets

(51) Int. Cl.
*H04W 24/08* (2009.01)
*H04W 56/00* (2009.01)
*H04W 72/04* (2009.01)
*H04W 84/18* (2009.01)
*H04W 84/20* (2009.01)

(52) U.S. Cl.
CPC ......... *H04W 24/08* (2013.01); *H04W 56/001* (2013.01); *H04W 84/18* (2013.01); *H04W 84/20* (2013.01)

(58) Field of Classification Search
USPC .................................................. 370/252–349
See application file for complete search history.

(56) References Cited

U.S. PATENT DOCUMENTS

| | | | |
|---|---|---|---|
| 2010/0091669 A1 | 4/2010 | Liu et al. | |
| 2016/0037449 A1* | 2/2016 | Kandhalu Raghu | H04W 52/0209 370/311 |
| 2016/0248886 A1* | 8/2016 | Thubert | H04L 67/40 |
| 2017/0003736 A1* | 1/2017 | Turon | G06F 1/3296 |

OTHER PUBLICATIONS

International Application No. PCT/US2016/064150, International Search Report and Written Opinion dated Feb. 23, 2017, 16 pages.

* cited by examiner

SELECTING A PARENT NODE IN A TIME-SLOTTED CHANNEL HOPPING NETWORK

CROSS REFERENCE TO RELATED APPLICATIONS

This application is related to and claims priority benefits of U.S. Provisional Application No. 62/261,046 ("the '046 application"), entitled "Method for Improving Network Join Time and Supporting Low Energy Devices in a TSCH Network" by inventors Jeffrey B. Shudark and James P. Hanley, filed on Nov. 30, 2015. The '046 application is hereby incorporated in its entirety by this reference.

TECHNICAL FIELD

This disclosure relates generally to networking and more particularly relates to selecting a parent node in a time-slotted channel hopping network.

BACKGROUND

A time-slotted channel hopping ("TSCH") network can be defined by IEEE 802.15.4 and provide a communications network for resource providers (e.g., utility companies, home automation providers, industrial automation providers, or scientific and environmental application providers). The resource providers may use the TSCH network to communicate between TSCH devices (e.g., electric meters, routers) and low-energy ("LE") devices that can be used to monitor or manage consumption of resources (e.g., electricity, heat, water, as well as other types of resources).

In some aspects, the TSCH devices, which can be referred to herein as parent nodes or TSCH nodes, can maintain synchronization with each other by periodically transmitting beacons to each other. In some aspects, LE devices can be Internet-Of-Things ("IoT") enabled devices that can be used in smart power grid and smart home technologies. LE devices can be used as endpoints in TSCH networks, which can be referred to herein as the primary network or the primary TSCH network, and communicate messages with A/C powered parent nodes. LE devices (referred to herein as LE nodes, LE endpoints, or LE endpoint nodes) can include battery powered devices, energy harvesting devices, or vampire tapping devices. LE nodes can communicate using a second, low energy hopping pattern in a secondary TSCH network. The secondary TSCH network used by the LE nodes uses a channel hopping protocol in which channel frequencies may switch at a much slower rate than the primary TSCH network used by the TSCH devices. The secondary TSCH network can be referred to herein as a low-energy time-slotted channel hopping ("LE-TSCH") network. The slower channel hopping protocol used by the LE-TSCH network can be referred to as a low energy channel hopping protocol. To save on power consumption and conserve battery life, the LE-TSCH network can allow LE nodes to enter a sleep state (i.e. turning off higher powered electronics such as oscillators or placing them in a low power mode). Because LE nodes are limited in the possible number of transmissions in a given TSCH timeslot, LE nodes may not transmit or receive the periodic beacons from A/C powered parent nodes for maintaining synchronization.

SUMMARY

The present disclosure describes systems and methods for selecting a parent node on a time-slotted channel hopping ("TSCH") network. In some examples, a low-energy node can synchronize communications with a channel hopping pattern of a primary TSCH network. The low-energy node can transmit a selection-phase enhanced beacon request that requests an enhanced beacon from TSCH nodes with availability to accept children and with at least a specified link quality using the synchronized communications. The low-energy node can receive a selection-phase enhanced beacon from a TSCH node and transmit an adoption request to the TSCH node. The low-energy node can receive an adoption response from the TSCH node that can indicate the TSCH node is managing the primary TSCH network join on behalf of the low-energy node.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
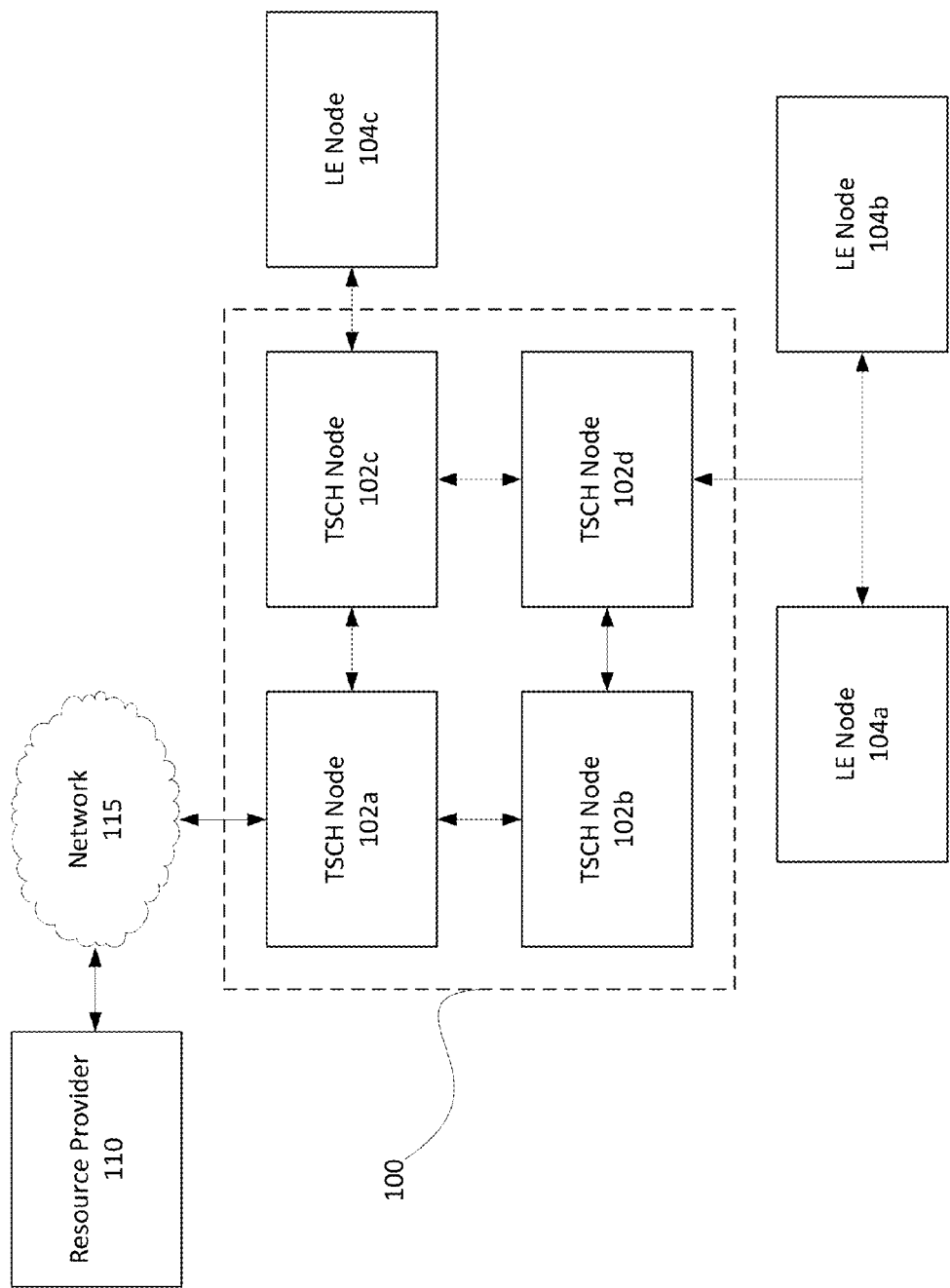
FIG. 1 is a block diagram of an example of a network for implementing synchronized communications between parent nodes operating on a primary time-slotted channel hopping ("TSCH") network and communicatively coupled low-energy nodes operating on a low-energy TSCH protocol according to one aspect of the present disclosure.

Certain aspects and features relate to a low-energy ("LE") node selecting a parent node from one or more time-slotted channel hopping ("TSCH") nodes in a primary TSCH network. A LE node can synchronize communications with a TSCH network based on transmitting a first enhanced beacon request to the TSCH network and receiving a first enhanced beacon. The enhanced beacon can include information for synchronizing communications between the LE node and the TSCH network. The LE node can determine a potential parent node from the one or more TSCH nodes by transmitting a second enhanced beacon request to the TSCH network using the synchronized communications. The LE node can receive a second enhanced beacon from the potential parent node and begin an adoption process to form the parent-child relationship.

A primary TSCH network can include multiple TSCH nodes in a mesh network that can provide communications with a resource provider. The TSCH nodes can communicate using a TSCH protocol, such as that defined by IEEE 802.15.4. By communicating using a TSCH protocol, TSCH nodes within the TSCH network can transmit and receive signals using a series of timeslots according to a scheduled frequency channel hopping pattern. The TSCH nodes can be configured to communicate with other TSCH nodes during a primary portion of a TSCH timeslot and listen for communications from LE nodes during a secondary portion of the TSCH timeslot. The TSCH nodes can communicate during the primary portion of the TSCH timeslot using a frequency channel determined by the TSCH channel hopping pattern and listen during the secondary portion on a low-energy network frequency channel.

The LE nodes can be powered by a limited power source (e.g., a battery) and cycle between a wake state and a sleep state to conserve energy. The LE nodes can operate on a low-energy channel hopping protocol, which can be a secondary TSCH protocol in which the LE nodes switch frequency channels at a rate slower than the frequency channel hopping pattern of the primary TSCH network. By communicatively coupling to a parent node in the TSCH network, LE nodes can communicatively couple to a resource provider while maintaining the wake/sleep cycle. In some examples, the parent-child relationship between a TSCH node and an LE node can be a published relationship. A TSCH node can publish that it is a parent for a LE node. Devices that transmit communications intended for the LE node can transmit those communications to the TSCH node. In additional or alternative examples, the parent node can receive and store the communications intended for the LE node and transmit the communications to the LE node during an awake cycle.

In some aspects, a LE node can transmit an enhanced beacon request to the primary TSCH network using a low-energy network frequency during a synchronization phase. Upon receiving the enhanced beacon request during the secondary portion of the TSCH timeslot, the TSCH node can transmit an enhanced beacon including information for the LE node to synchronize communications with the primary TSCH network. In some examples, the clock of the LE node may have drifted during a sleep state and the LE node may realign the clock based on the information included in the enhanced beacon. The information may also include synchronization period information, which is the duration information for the sleep/wake cycle, and the Absolute Slot Number ("ASN") used by the LE node to realign its timeslots. In some examples, the information may also include flags to indicate to the LE node that there is a pending packet to be transmitted to the LE node.

In additional or alternative aspects, once synchronized the LE node can transmit another enhanced beacon request to the primary TSCH network using the synchronized communications. Upon receiving the enhanced beacon request during a primary portion of the TSCH timeslot, a TSCH node can transmit an enhanced beacon if the TSCH node has availability to accept a child node. In some examples, the enhanced beacon request filters potential parents by specifying a link quality for potential parent nodes. The TSCH node may transmit the enhanced beacon if the TSCH node also has a link quality with the LE node that exceeds the specified value. The TSCH node may transmit the enhanced beacon at a random offset during the timeslot to prevent collision with other enhanced beacons transmitted by other TSCH nodes in response to the enhanced beacon request. The LE node can compare the TSCH nodes that transmitted an enhanced beacon and transmit an adoption request to one of the TSCH nodes requesting the TSCH node take the LE node as a child node.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Referring now to the drawings, FIG. 1 depicts a primary TSCH network 100. The primary TSCH network 100 includes TSCH nodes 102a-d communicatively coupled to each other using a TSCH protocol. Some of the TSCH nodes 102c-d are communicatively coupled to LE nodes 104a-c. The primary TSCH network 100 is communicatively coupled to a central system, such as a system associated with a resource provider 110 via a network 115. In some examples, the network 115 can be a wireless network (e.g., a Wi-Fi network or a cellular network), include intermediary devices, or include intranets or the internet.

In some aspects, the TSCH nodes 102a-d can include persistent power supplies. For example, the TSCH nodes 102a-d may be powered by standard A/C power. In additional or alternative examples, the TSCH nodes 102a-d may be Mains powered or have a power backup (e.g., battery backed or supercapacitor backed) so that the primary TSCH network 100 can remain operational for an amount of time allowable by the backup during a power failure.

The LE nodes 104a-c can be used to perform one or more applications relating to managing, monitoring, or otherwise using information regarding one or more attributes of a resource distribution system associated with the resource provider 110. In some examples, a LE node 104a-c can include an intelligent metering device for monitoring and analyzing resource consumption, a programmable thermostat for managing resource consumption, or an in-home display device for displaying information related to resource consumption and associated billing information for the resource consumption. LE nodes 104a-c can include other Internet-Of-Things enabled devices for providing smart home capabilities in a home area network.

The LE nodes 104a-c can be powered by a power source with a limited ability for sustained power usage but that can provide enough power for bursts of communication. The bursts of communication can allow the LE nodes 104a-c to communicate with the primary TSCH network 100 for synchronization, receiver initiated transport ("RIT") command responses, unsolicited push messages, and other burst communications. LE nodes 104a-c may also use alternative sources of low power. For example, LE nodes 104a-c may be powered by vampire tapping power, power harvesting, and other processes where powering applications for sustained periods can be limited.

The LE nodes 104a-c can be configured to conserve energy usage by periodically shutting down or limiting power to components and thus cycle between a sleep state and a wake state. In some examples, the components can include high power components including a temperature compensated crystal oscillator (TCXO) and transceivers. LE nodes 104a-c can form a secondary network and can communicate with other LE nodes on the secondary network using a low-energy TSCH protocol. The secondary network may be referred to herein as a low-energy TSCH network ("LE-TSCH network"). The channel hopping pattern used by the LE-TSCH network can be referred to as a low-energy channel hopping pattern, in which frequency channels can change at a slower rate than in the channel hopping pattern for the TSCH protocol used by the primary TSCH network.

In some aspects, the LE nodes 104a-c are each communicatively coupled to a parent node of the primary TSCH network 100. For example, TSCH node 102d is a parent node for LE node 104a and LE node 104b. TSCH node 102c is a parent node for LE node 104c. The parent-child relationship between a TSCH node and an LE node can be a published relationship. For example, TSCH node 102c can publish that it is a parent for LE node 104c or the LE node 104c can advertise that the LE node 104c can be reached through the TSCH node 102. Devices that transmit communications intended for LE node 104c can transmit those communications to TSCH node 102c. If the LE node 104c is in a sleep state when TSCH node 102c receives communication intended for LE node 104c, TSCH node 102c can store the communication in memory. The TSCH node 102c can forward the communication to LE node 104c when LE node 104c exits the sleep state and starts listening for communications.

In some examples, a parent node (e.g., TSCH nodes 102d) may support multiple child nodes (e.g., LE nodes 104a-b) based on the resources available to the parent node. For each child node, a parent node may assist the child node by supporting the LE channel hopping pattern via a dual media access control ("MAC") profile, processing enhanced beacon requests, decrypting and buffering downstream messages, using RIT to deliver buffered messages to child nodes, and encrypting upstream traffic on behalf of the child node.

In some aspects, the TSCH nodes 102c-d can each implement concurrent MAC on a single interface. The TSCH nodes 102c-d can each communicate with other TSCH nodes on the primary TSCH network 100 and communicatively coupled LE nodes via a single radio transceiver. In additional or alternative aspects, concurrent MAC can be implemented on more than one interface.

The primary TSCH network 100 can use a TSCH protocol to communicate information within the primary TSCH network 100 and outside the primary TSCH network 100. Devices within the primary TSCH network 100 can be synchronized according to a TSCH channel hopping pattern. To communicate with other TSCH node and a communicatively coupled LE node 104c (operating on a low-energy channel hopping protocol), the TSCH nodes 102a-d can alternate communication periods between the primary TSCH network 100 and the communicatively coupled LE node 104c by sub-dividing TSCH timeslots used in the primary TSCH network 100.

In the primary TSCH network 100, there may be instances when there is unused time within a timeslot. For example, if TSCH node 102c listening for communication does not receive a communication from another TSCH node within a predefined period of time, the TSCH node 102c may determine that no communication will be received during that timeslot, leaving the remainder of that timeslot unused. A TSCH node 102a-d can communicate with both the primary TSCH network 100 and with an LE node 104a-c by alternating receive periods in a sequence of TSCH timeslots and listening for communication from the LE nodes 104a-c during unused portions of the timeslots of the primary TSCH network 100. By interleaving communications with an LE network and the primary TSCH network 100, LE nodes 104a-c can initiate enhanced beacon requests with a much greater likelihood that a TSCH node 102a-d will hear the request.

Figure 4:
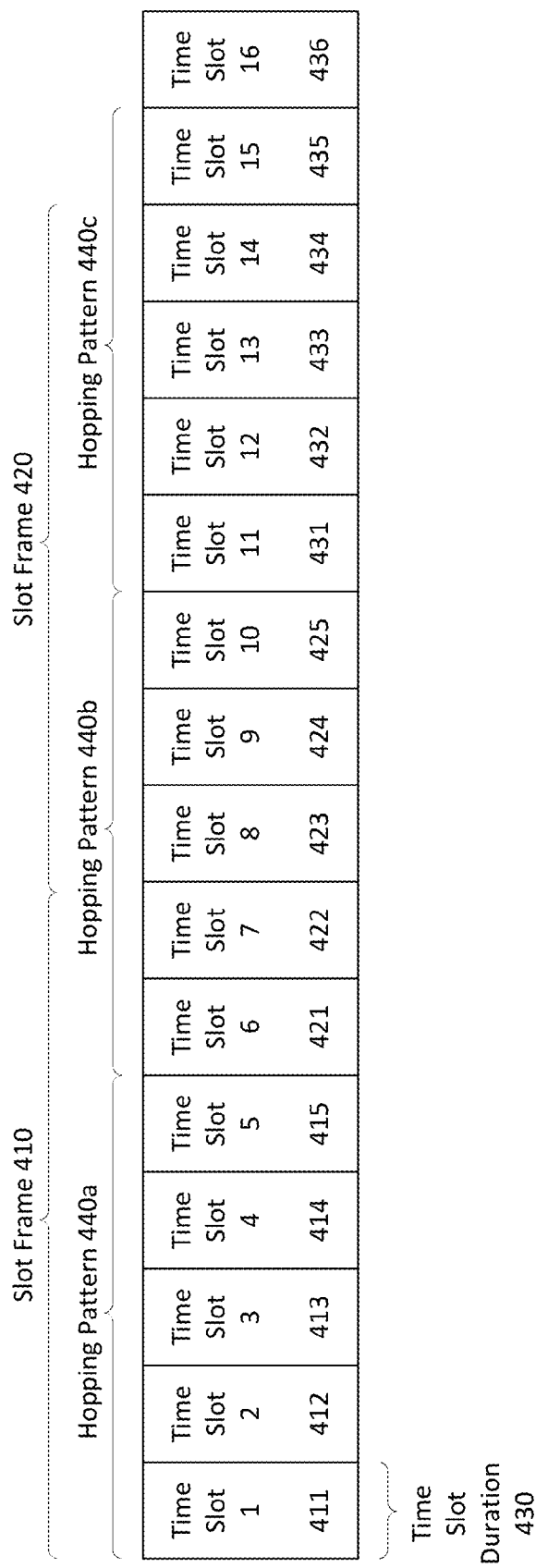
FIG. 4 is a is a block diagram of an example of an arrangement of timeslots in a time-slotted channel hopping pattern according to one aspect of the present disclosure.

Each timeslot in a primary TSCH network 100 is of a time duration of duration "T" which can be defined in milliseconds or other appropriate time unit. The primary TSCH network 100 can also use multiple channel frequencies for communication between the TSCH nodes 102a-d in the network. A hopping pattern defines the channel used to communicate during each timeslot. FIG. 4 is a diagram illustrating timeslots and a channel hopping pattern for the primary TSCH network 100.

Figure 2:
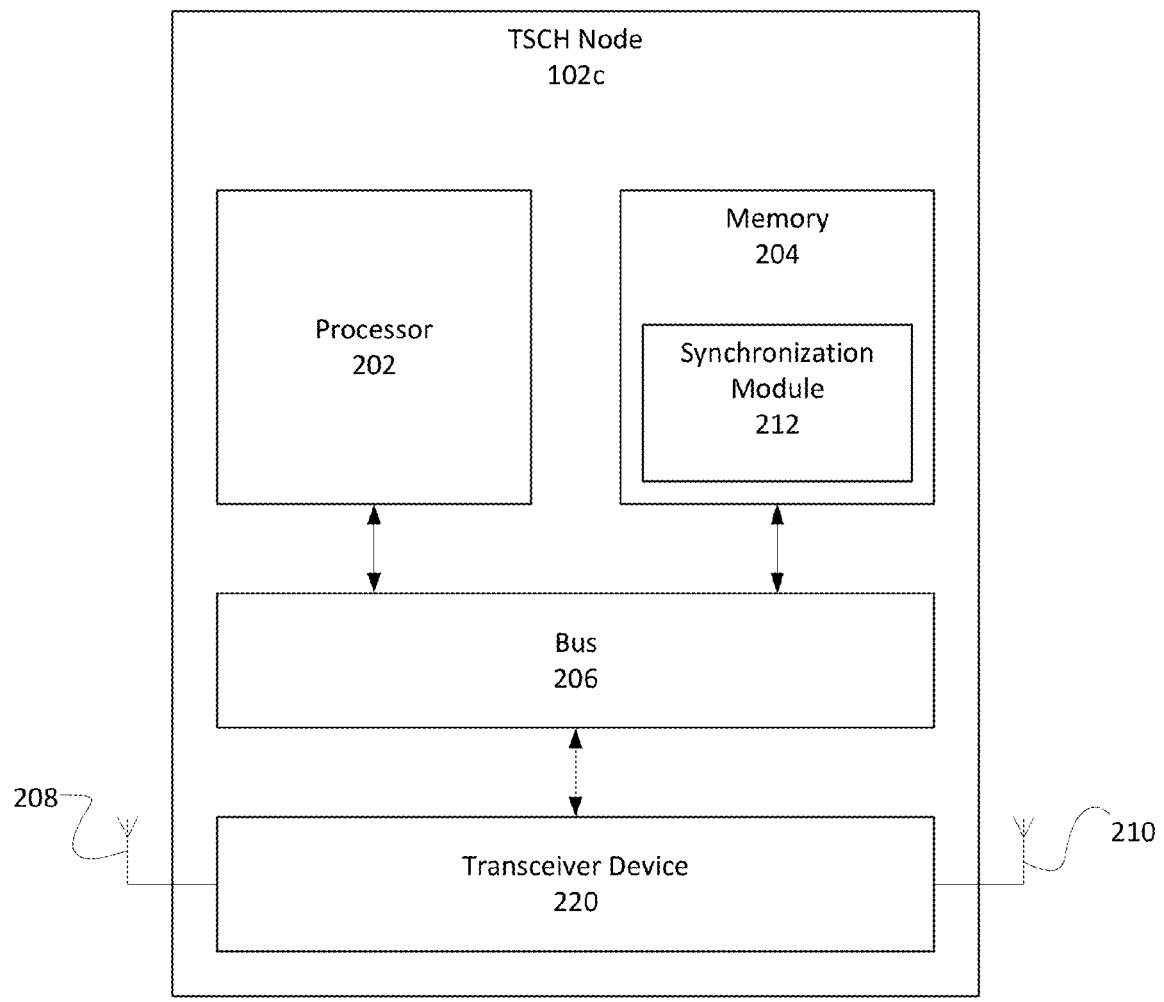
FIG. 2 is a block diagram of an example of a TSCH node according to one aspect of the present disclosure.

FIG. 2 depicts an example of the TSCH node 102c illustrated in FIG. 1. The TSCH node 102c includes a processor 202, memory 204, and a transceiver device 220 each communicatively coupled via a bus 206. The components of TSCH node 102c can be powered by a steady A/C power supply. The TSCH node 102c can be a part of the primary TSCH network 100.

The transceiver device 220 can include (or be communicatively coupled to) an antenna 208 for communicating with other TSCH nodes in the primary TSCH network 100. The transceiver device 220 can also include (or be communicatively coupled to) an antenna 210 for communicating with child nodes (e.g., LE node 104c). In some examples, the transceiver device 220 can include a radio-frequency ("RF") transceiver and other transceivers for wirelessly transmitting and receiving signals. In some aspects, the transceiver device 220 can handle a concurrent MAC implemented on one or more interfaces to communicate with other TSCH nodes and a communicatively coupled LE node 104c via antenna 208. For example, the TSCH node 102c may communicate with other TSCH nodes on the primary TSCH network 100 and the LE node 104c on the secondary network using the same antenna 208 for multiple MAC interfaces handled by the transceiver device 220.

In some examples, the processor 202 includes a microprocessor, an application-specific integrated circuit ("ASIC"), a state machine, a field programmable gate array ("FPGA") or another suitable processing device. The processor 202 can include any number of processing devices, including one. The processor 202 can be communicatively coupled to a non-transitory computer-readable media, such as memory 204. The processor 202 can execute computer-executable program instructions or access information stored in memory 204.

The program instructions can include a synchronization module 212 that is executable by the processor 202 to perform certain operations described herein. For example, the operations can include listening, during a primary portion of a TSCH timeslot, for a communication from a TSCH node on the primary TSCH network 100. When no communication is received during the primary portion of the TSCH timeslot, the operation can further include listening on a low-energy network channel during a secondary portion of the TSCH timeslot for a synchronization-phase enhanced beacon request from one of the LE nodes 104a-c. The operations can further include transmitting a synchronization-phase enhanced beacon to one of the LE nodes 104a-c for synchronizing communications between the LE node 104a-c and the primary TSCH network 100.

In additional or alternative examples, the operations can include a process for communicating with a LE node (e.g., LE nodes 104a-c) and being selected as a parent node for the LE node. The transceiver device 220 can receive a selection-phase enhanced beacon request from the LE node. The processor 202 can determine that the TSCH node 102c has availability to accept a child node and that the TSCH node 102c has a link quality with the LE node that exceeds a threshold value indicated in the selection-phase enhanced beacon request. The processor 202 can instruct the transceiver device 220 to transmit a selection-phase enhanced beacon indicating the TSCH node 102c is a potential parent. The transceiver device 220 can receive an adoption request from the LE node and transmit an adoption response to the LE node. The TSCH node 102c can also manage the join process on behalf of the LE node.

Memory 204 may be a computer-readable medium such as (but not limited to) an electronic, optical, magnetic, or other storage device capable of providing a processor with computer-readable instructions. Some examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Additional or alternative examples of suitable computer-programming languages include C, C++, C#, Visual Basic, Java, Python, Perl, JavaScript, and ActionScript.

Although the processor 202, memory 204, and the bus 206 are depicted in FIG. 2 as separate components in communication with one another, other implementations are possible. For example, the processor 202, memory 204, and the bus 206 can be respective components of respective printed circuit boards or other suitable devices that can be disposed in a TSCH node to store and execute programming code.

Figure 3:
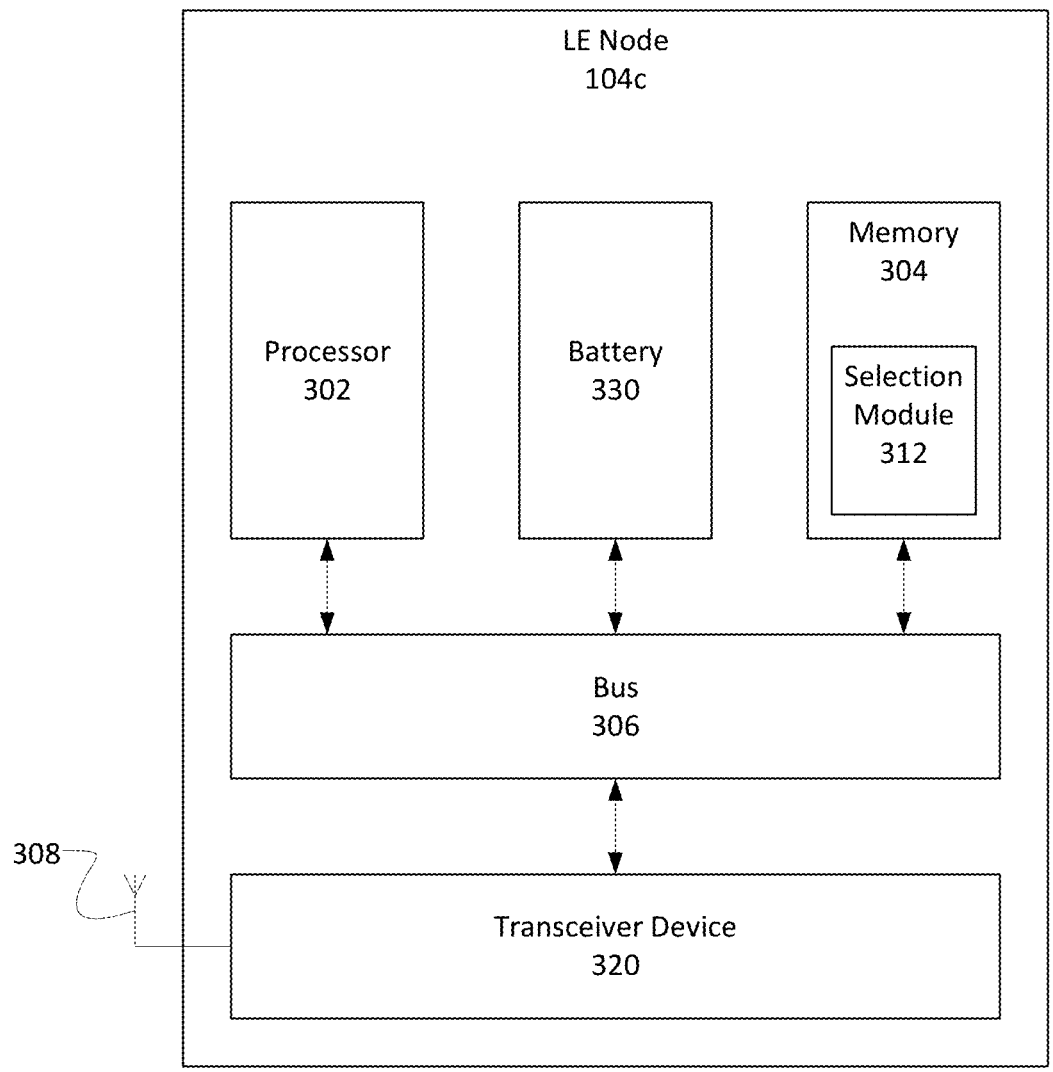
FIG. 3 is a block diagram of an example of a low-energy node according to one aspect of the present disclosure.

FIG. 3 depicts an example of the LE node 104c illustrated in FIG. 1 for communicating with TSCH node 102c illustrated in FIG. 2. The LE node 104c includes a processor 302, memory 304, and a transceiver device 320 each communicatively coupled via a bus 306. In some aspects, the processor 302, the memory 304, the transceiver device 320, and the bus 306 can be similar to the processor 202, the memory 204, the transceiver device 220, and the bus 206 respectively as described above with respect to FIG. 2. In additional or alternative aspects, the processor 302, memory 304, the transceiver device 320, and the bus 306 can be powered by a battery 330.

The LE node 104c can be a child node to TSCH node 102c, which can be referred to as a parent node. The transceiver device 320 can include (or be communicatively coupled to) an antenna 308 for communicatively coupling the LE node 104c and the TSCH node 102c. The processor 302 can be communicatively coupled to a non-transitory computer-readable media, such as memory 304. The processor 302 can execute computer-executable program instructions or access information stored in memory 304.

The program instructions can include a selection module 312 that is executable by the processor 202 to perform certain operations described herein. For example, the operations can include synchronizing communications with a channel hopping pattern of the primary TSCH network 100 by communicating with one of the TSCH nodes 102a-d during a synchronization phase. The processor 202 can instruct the transceiver device 320 to transmit a selection-phase enhanced beacon request using the synchronized communications during a selection phase. The selection-phase enhanced beacon request can be a signal that requests an enhanced beacon from TSCH nodes 102a-d if the TSCH node 102a-d has availability to accept children and the TSCH node 102a-d has at least a specified link quality with the LE node 104c. The transceiver device 320 can receive a selection-phase enhanced beacon from one or more of the TSCH nodes 102a-d and the processor 202 can select one of the TSCH nodes 102a-d as a parent node. The processor 202 can instruct the transceiver device 320 to transmit an adoption request based on selecting one of the TSCH nodes 102a-d as a parent node. The processor 202 can further instruct the transceiver device 320 to listen for an adoption response indicating the selected TSCH node 102a-d is managing the primary TSCH network join on behalf of the LE node 104c.

FIG. 4 is described below as a time-slotted channel hopping pattern for the primary TSCH network 100 depicted in FIG. 1, but other implementations are possible. The time-slotted channel hopping pattern includes timeslots 411-415, 421-425, and 431-436, each with the same timeslot duration 430. As an example, timeslot duration 430 can be 25 milliseconds. Each slot frame 410 and 420 includes seven timeslots. FIG. 4 also illustrates the channel hopping pattern 440 (shown as channel hopping patterns 440a-c). A channel hopping pattern defines a channel frequency or channel for each timeslot in the hopping pattern. For example, the hopping pattern 440a may be channel 4, channel 6, channel 3, channel 5, and channel 7. The hopping pattern may associate channel 4 with timeslot 1, channel 6 with timeslot 2, channel 3 with timeslot 3, channel 5 with timeslot 4, and channel 7 with timeslot 5. In FIG. 4 the hopping pattern 440a has a hopping pattern length of 5. The hopping pattern repeats. The first illustrated iteration of the hopping pattern 440a contains timeslots 1-5 (411-415), the second iteration of the hopping pattern 440b contains timeslots 6-10 (421-425), and the third iteration of the hopping pattern 440c contains timeslots 11-15 (431-436). The number of timeslots in a hopping pattern can be independent of the number of timeslots in a slot frame.

While TSCH nodes 102a-d, communicating using a TSCH protocol, change channel frequencies every timeslot duration 430 (e.g., every 25 milliseconds), LE nodes 104a-c operate on a low-energy channel hopping protocol that is a low-energy TSCH protocol, where channel frequencies change at a slower rate than the channel hopping pattern of the primary TSCH network 100. For example, LE nodes 104a-c may change channel frequencies every 1,024 timeslots (i.e. for a 25 millisecond timeslot, LE nodes 104a-c may switch to a different channel every 25.6 seconds).

The TSCH nodes 102c-d can be parent nodes and determine the parameters of the low-energy channel hopping pattern to be used by the communicatively coupled LE nodes 104a-c. The TSCH nodes 102c-d can communicate the low-energy channel hopping patterns to any communicatively coupled LE nodes 104a-c. For example, when LE nodes 104a-c first join and communicatively couple to a TSCH node 102c-d, the TSCH node 102c-d communicates the respective low-energy channel hopping pattern used in the LE-TSCH network to the LE nodes 104a-c. Accordingly, the TSCH nodes 102c-d are able to switch to the appropriate low-energy channel to communicate with the LE nodes 104a-c on the corresponding low-energy channels. As mentioned above, the TSCH nodes 102c-d can sub-divide TSCH timeslots 411-415, 421-425, 431-436 to communicate with other TSCH nodes 102a-d and with communicatively coupled LE nodes 104a-c.

In some aspects, the low-energy network channel hopping pattern used by LE nodes 104a-c may be controlled by the TSCH nodes 102c-d. In additional or alternative aspects, each LE node 104a-c may operate an independent low-energy channel hopping pattern, in which case the TSCH nodes 102c-d can store in memory the low-energy channel hopping patterns of the different LE nodes 104a-c (e.g., TSCH node 102d stores in memory the different channel hopping patterns operated by LE node 104a and LE node 104b).

Figure 5:
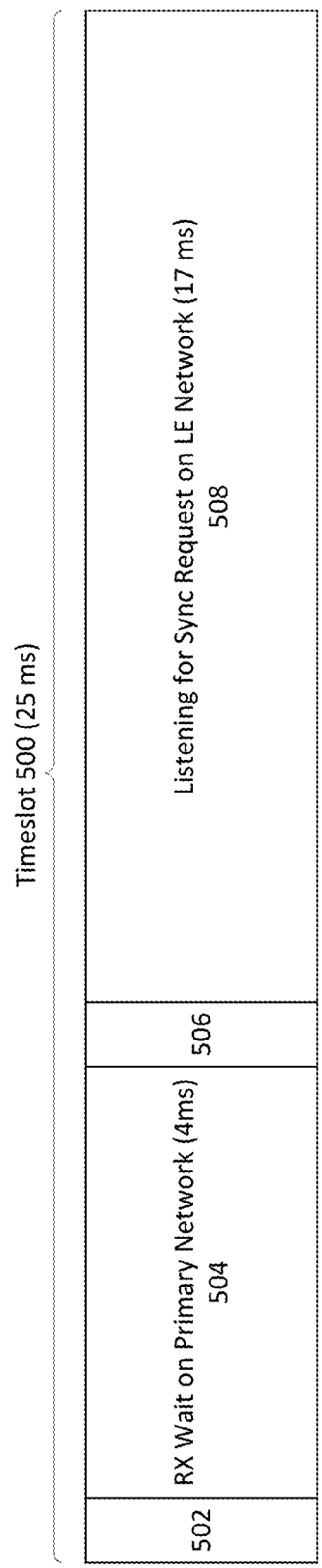
FIG. 5 is a block diagram of an example of a timeslot according to one aspect of the present disclosure.

FIG. 5 is a TSCH timeslot structure for timeslot 500. In some aspects, the timeslot 500 represents a structure of one of the timeslots 411-415, 421-425, 431-436 of FIG. 4, but other configurations are possible. FIG. 5 is described below in relation to the primary TSCH network 100 depicted in FIG. 1, but other implementations are possible. In this example, the time periods shown are exemplary, other values may be used in other implementations. For example, timeslot 500 may be of a duration of 25 milliseconds, but other periods of a time are also possible. In the TSCH timeslot structure, a TSCH node 102c in the primary TSCH network 100 can listen on a channel determined by the TSCH hopping pattern during a primary portion 504 of the timeslot 500.

In some aspects, a timeslot 500 can include an RF settle period 502. After the RF settle period 502, the TSCH node 102c can listen for receive signals on a channel for a first period of time referred to as the primary portion 504 of the timeslot 500 (shown as RX wait time). The primary portion 504 of the timeslot 500 can be any length of time (e.g., for 4 milliseconds). If the TSCH node 102c receives a message prior to the expiration of the primary portion 504, then the TSCH node 102c can proceed to receive the rest of the message for the duration of the timeslot 500 and process the received message. However, if the TSCH node 102c does not receive a message prior to the expiration of the primary portion 504, then the TSCH node 102c may determine that it will not receive a communication from another TSCH node over the primary TSCH network 100 during the present timeslot 500.

Following a second RF settle period 506, the TSCH node 102c can listen for communications from a communicatively coupled LE node 104a-c during a secondary portion 508 of the TSCH timeslot 500. In this example, the secondary portion 508 of the TSCH timeslot 500 is for 17 milliseconds. The TSCH node 102c can listen for synchronization requests (e.g., synchronization-phase enhanced beacon requests) from a communicatively coupled LE node 104a-c. As the LE node 104a-c may be communicating on a different frequency channel than the channel used for TSCH timeslot 500 (according to the TSCH channel hopping pattern), the TSCH node 102c can switch channel frequencies to listen for communications on the corresponding low-energy network channel during the secondary portion 508 of the timeslot 500. The TSCH node 102c can identify the correct channel frequency to listen for communications on the low-energy network channel based on the low-energy channel hopping pattern.

Once the TSCH node 102c receives an enhanced beacon request, the TSCH node 102c can transmit an enhanced beacon on a primary portion of a subsequent timeslot on the low-energy network channel. The enhanced beacon can include the synchronization data that enables the LE node 104c to synchronize with the faster channel hopping pattern of the primary TSCH network 100.

To communicate with the LE network, TSCH nodes 102a-d in the primary TSCH network 100 can use the LE network hopping pattern when listening for communications from a LE node 104a-c (e.g., during the secondary portion 508 of the timeslot 500 shown in FIG. 5). However, each TSCH node 102a-d can operate on a separate channel offset based on a unique identifier (e.g., a MAC address of the TSCH node 102a-d, UEI64, or similar unique identifier). In some aspects, parent nodes (e.g., TSCH nodes 102c-d in FIG. 1) can listen for communications from child nodes (e.g., LE nodes 104a-c) simultaneously on different channels based on a channel offset. The communications from a child node may be more likely to be received when each parent node listens on a different channel.

To join the primary TSCH network 100, an LE node 104a-c can initiate a series of enhanced broadcast messages to register with the primary TSCH network 100 and to select the optimal TSCH node 102a-d as a parent. Upon registering, to maintain clock synchronization of the LE node 102a-c to the primary TSCH network 100, a LE node 104a-c can use an enhanced beacon from a TSCH node 102a-d to align an internal clock of the LE node 104a-c with the timeslots 411-415, 421-425, 431-436 of the primary TSCH network 100.

Figure 6:
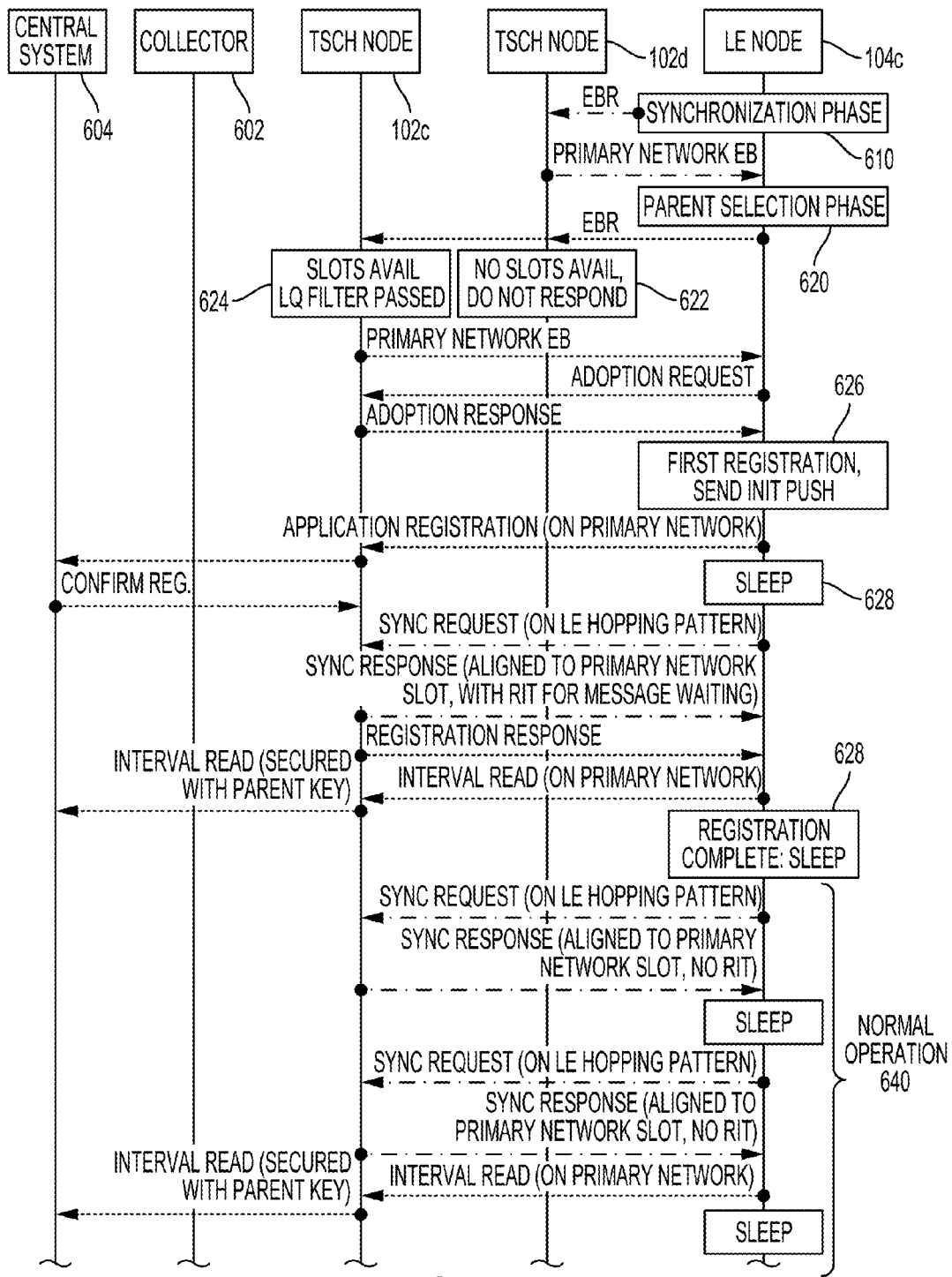
FIG. 6 is a signal flow diagram of an example of a process for selecting a parent node in a TSCH network according to one aspect of the present disclosure.
Figure 7:
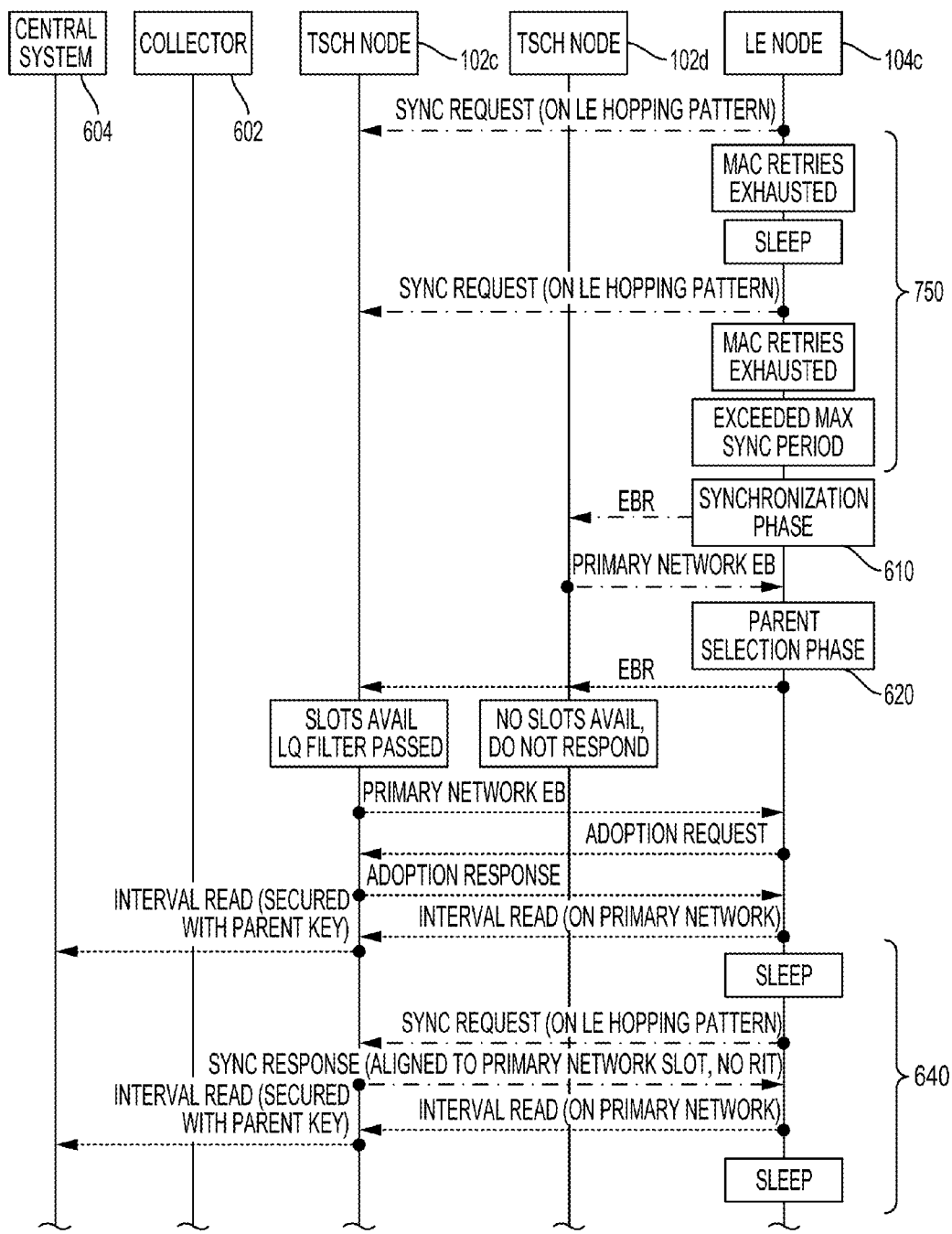
FIG. 7 is a signal flow diagram of an example of a process for resynchronizing a low-energy node and a parent node according to one aspect of the present disclosure.
Figure 8:
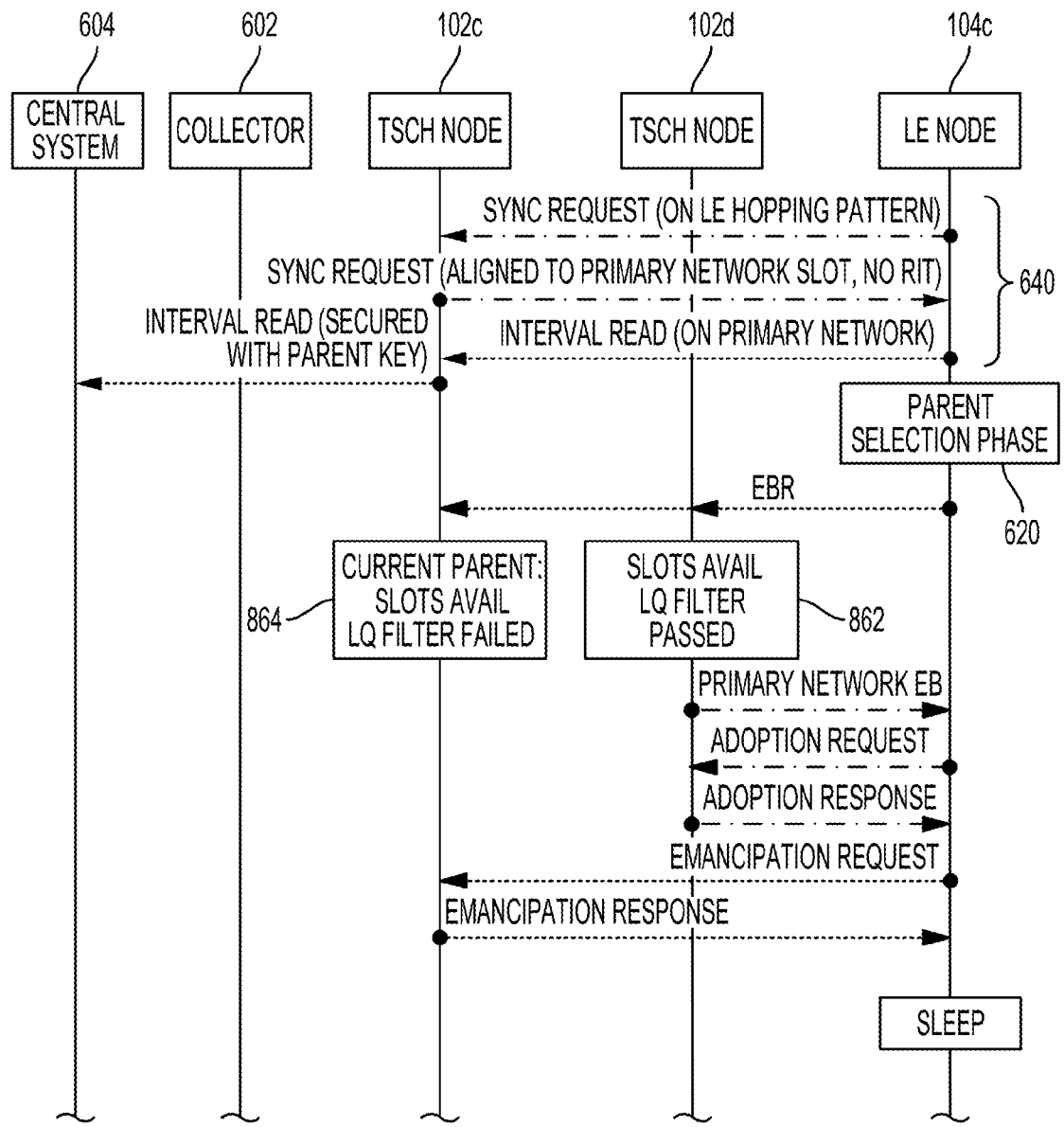
FIG. 8 is a signal flow diagram of an example of a process for selecting a new parent node for a low-energy node according to one aspect of the present disclosure.

FIGS. 6-8 are a signal flow diagram depicting processes for synchronizing with the TSCH network 100 of FIG. 1 and selecting a parent node from the TSCH nodes 102c-d in the TSCH network 100. Initial registration with the primary TSCH network 100 begins with a synchronization phase 610. In the synchronization phase 610, the LE node 104c synchronizes communications with the primary TSCH network 100. A parent selection phase 620 can follow the synchronization phase 610 and the parent selection phase 620 can include the LE node 104c selecting a parent node.

Synchronization phase 610 begins with the LE node 104c transmitting a synchronization-phase enhanced beacon request for finding TSCH nodes 102c-d. The TSCH nodes 102c-d can listen for communication from potential LE nodes (e.g., LE node 104c) during the unused portion of the TSCH timeslot. In the synchronization phase 610, TSCH node 102d receives the synchronization-phase enhanced beacon request. The TSCH node 102d transmits a synchronization-phase enhanced beacon in response that is slot aligned with the next primary network timeslot and can contain information to allow the LE node 104c to synchronize to the primary TSCH network 100. In some examples, if the synchronization-phase enhanced beacon request is received at the very end of the current primary network timeslot and overflows over into the subsequent timeslot, the TSCH node 102d that received the synchronization-phase enhanced beacon request can wait until the beginning of the following TSCH timeslot to transmit the synchronization-phase enhanced beacon. As this can result in a delay, the LE node 104c may wait for a synchronization-phase enhanced beacon from a TSCH node 102c-d before re-transmitting a synchronization-phase enhanced beacon request. After the LE node 104c receives the enhanced beacon, the LE node 104c can proceed with a parent selection phase 620.

The parent selection phase 620 can begin in response to the LE node 104c synchronizing communications with the primary TSCH network 100. Once a synchronization-phase enhanced beacon request is received, the LE node 104c can reliably synchronize to the primary TSCH network 100 and select a parent node. The LE node 104c can begin the parent selection phase 620 with a series of selection-phase enhanced beacon requests.

In some aspects, the transmitted selection-phase enhanced beacon request can include an enhanced beacon filter requesting parents with availability to accept new children that also have a high link quality (e.g., a link quality that exceeds a specified threshold). If no selection-phase enhanced beacons are received, the LE node 104c can adjust the specified threshold successively, so that the LE node 104c selects the available parent node with the strongest link quality. In some examples, the parent node with the strongest link quality is the parent node that is as near as possible in proximity to the LE node 104c. However, if multiple potential parent nodes receive the selection-phase enhanced beacon request and have characteristics that pass the enhanced beacon filter, multiple potential parent nodes may respond simultaneously as they are synchronized on the primary TSCH network 100. In some examples, to prevent simultaneous selection-phase enhanced beacon collisions, potential parent nodes can respond at a random timeslot offset.

In FIG. 6, the LE node 104c transmits the selection-phase enhanced beacon request to the primary TSCH network 100 and the selection-phase enhanced beacon request is received by both TSCH node 102c and TSCH node 102d. In block 622, the TSCH node 102d fails the enhanced beacon filter by not having availability to accept new children, so the TSCH node 102d does not respond. In block 624, the TSCH node 102c passes the enhanced beacon filter by having a link quality that exceeds the specified value in the enhanced beacon request. The TSCH node 102c transmits a selection-phase enhanced beacon to the LE node 104c indicating the TSCH node is a potential parent node.

In this example, the LE node 104c only receives a selection-phase enhanced beacon from TSCH node 102c and LE node 104c selects TSCH node 102c as a parent node. The LE node 104c transmits an adoption request message to the selected TSCH node 102c. The TSCH node 102c can respond with an adoption response. In this example, if successful, the TSCH node 102c manages the rest of the network join (e.g., application registration) on behalf of the LE node 104c. In additional or alternative examples, the LE node 104c may manage the rest of the network join based on receiving the adoptions response. In block 626, the LE node 104c transmits registration information to the TSCH node 102c, which communicates with a central system 604 to complete the registration of the LE node 104c on the primary TSCH network 100. In some examples, a collector (602 e.g., another TSCH node or a device communicatively coupled to the primary TSCH network) can provide a communication path between the TSCH node 102c and the central system 604. The LE node 104c can enter a sleep state 628 for a predetermined period of time after receiving the adoption response.

The LE node 104c may wake up and communicate with TSCH node 102c to maintain synchronized communication. The time between synchronization communications can be configured. For example, upon waking, the LE node clock may have drifted. The LE node 104c can transmit a message to the TSCH node 102c for re-synchronization. The message can be a proprietary synchronization request or a dedicated enhanced beacon request. If the TSCH node 102c receives the synchronization request during the listen portion of the current TSCH timeslot, the TSCH node 102c can transmit a synchronization response (e.g., an enhanced beacon time aligned with the current timeslot of the primary TSCH network 100). The TSCH node 102c can wait until the beginning of the next available timeslot of the primary TSCH network 100 to transmit the synchronization response. After the LE node 104c transmits the synchronization request, the LE node 104c can automatically transition to a "listen" mode, listening for communications from the TSCH node 102c. Since the synchronization response is aligned to a primary TSCH network timeslot and contains the primary TSCH network ASN, the LE node 104c can resynchronize to the primary TSCH network 100. The synchronization response can include: the primary TSCH network ASN, the primary network hopping index, RIT information, and Global Time IE. The LE node 104c can use the synchronization response message to align its internal clock. During normal operation 640, each time the LE node 104c awakes from a sleep state 628, the child LE node resynchronizes its clock using the synchronization request and synchronization response communication described above. This process can maintain clock synchronization between the LE network and primary TSCH network 100 and can help reduce clock drift.

In some aspects, the parent node (e.g., TSCH node 102c) may transmit a RIT message along with the synchronization response. An RIT message can indicate that the parent TSCH node has a message waiting for the child node (e.g., LE node 104c). For example, the parent node may have received a message intended for the child node, and the parent node may have stored the message until the child node awoke from the sleep state 628. The encryption and decryption for LE nodes may be handled by the parent node. The parent node can transmit a payload including the message along with the synchronization response. In the event that an RIT is included in the synchronization response, the LE child node channel hops along the primary network timeslots to receive the downstream traffic. If no RIT message is included in the synchronization response, then the child node can readjust its internal clock to synchronize with the primary TSCH network and return to a sleep state. Additionally, if there is upstream data to send, the child node can transmit the upstream data information along the primary network timeslots to the parent node. The parent node can transmit the upstream data information to other devices in the primary TSCH network or to a device communicatively coupled to the primary TSCH network.

FIG. 7 depicts a signal flow diagram of a process for resynchronizing if, upon waking up from a sleep state 628, the LE node clock has drifted and exceeded a threshold value. The threshold value can represent an amount out of clock drift such that the LE node may be unable to communicate with the parent node to perform synchronization adjustments. During blocks 750, the LE node 104c transmits synchronization requests and fails to receive a response. After a predetermined number of failed synchronization requests, the LE node 104c can reperform the synchronization phase 610 to synchronize with a parent node and reperform parent selection phase 620 to select a parent node before returning to normal operation 640.

FIG. 8 depicts a signal flow diagram for selecting a new parent node. After a period of time, the LE child node may search for a more optimal parent node. This is accomplished by re-running the parent selection phase 620 as described above immediately after completing a normal operation 640 synchronization to the current parent node 102c. If a new parent node 102d with availability is found that has better link quality value, then the LE node 104c will emancipate from the current parent node 102c after positive confirmation that an adoption response has been received from the new parent node 102d.

An emancipation request can be transmitted from the LE node 104c to a former parent node 102c to inform the former parent node 102c that the LE node has chosen a different parent node 102d. Upon reception of the emancipation request, the former parent node 102c may free the resources previously used in managing the LE node 104c. The former parent node 102c can also transmit an emancipation response, acknowledging that the emancipation request was processed successfully.

Although FIGS. 6-8 depict the LE node 104c selecting a parent node for performing operations on behalf of the LE node 104c, the LE node 104 can perform the operations itself. For example, the LE node 104c can manage communications with the central system and manage joining the network.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

Further, while the embodiments disclosed herein are described with respect to TSCH nodes that are A/C powered and LE nodes that are battery powered, it should be understood that these embodiments are provided for purposes of example rather than limitation. Embodiments disclosed herein do not preclude use of TSCH nodes in a TSCH network that are powered by non-A/C sources and/or LE nodes that are powered by non-battery sources of power.

What is claimed is:

1. A method comprising:
   synchronizing, by a low-energy node, communications with a channel hopping pattern of a primary time-slotted channel hopping ("TSCH") network to synchronize a clock of the low-energy node with the primary TSCH network;
   after synchronizing the communications, transmitting, by the low-energy node, a selection-phase enhanced beacon request that requests an enhanced beacon from TSCH nodes with availability to accept child nodes and with at least a specified link quality;
   receiving, by the low-energy node, a selection-phase enhanced beacon from a first TSCH node;
   transmitting, by the low-energy node, an adoption request to the first TSCH node requesting the first TSCH to adopt the low-energy node as a child node; and
   receiving, by the low-energy node, an adoption response from the first TSCH node indicating the first TSCH node agrees to adopt the low-energy node as a child node and is managing the primary TSCH network join on behalf of the low-energy node.

2. The method of claim 1, wherein the selection-phase enhanced beacon is a first selection-phase enhanced beacon, the method further comprising:
   receiving, by the low-energy node, a second selection-phase enhanced beacon from a second TSCH node;
   comparing link quality information from the first selection-phase enhanced beacon with link quality information from the second selection-phase enhanced beacon; and
   when the comparison indicates that the first TSCH node provides better link quality than the second TSCH node, then selecting the first TSCH node as a parent node.

3. The method of claim 1, wherein synchronizing communications with the channel hopping pattern of the primary TSCH network comprises:
   transmitting, by the low-energy node, a synchronization-phase enhanced beacon request on a low-energy network channel; and
   receiving, by the low-energy node, a synchronization-phase enhanced beacon including information for synchronizing communications with the channel hopping pattern of the primary TSCH network.

4. The method of claim 3, wherein synchronizing communications with the channel hopping pattern of the primary TSCH network further comprises:
   listening, by the low-energy node, a predetermined amount of time for the synchronization-phase enhanced beacon; and
   in response to not receiving the synchronization-phase enhanced beacon during the predetermined amount of time, transmitting, by the low-energy node, another synchronization-phase enhanced beacon request.

5. The method of claim 1, further comprising:
   waking, by the low-energy node, from a sleep state; and
   resynchronizing, by the low-energy node, communications with the channel hopping pattern of the primary TSCH network.

6. The method of claim 5, wherein the selection-phase enhanced beacon request is a first selection-phase enhanced beacon request, the selection-phase enhanced beacon is a first selection-phase enhanced beacon, the adoption request is a first adoption request, and the adoption response is a first adoption response, the method further comprising:
   transmitting, by the low-energy node, a second selection-phase enhanced beacon request that requests another enhanced beacon from the TSCH nodes with availability to accept children and with at least the specified link quality using the resynchronized communications;
   receiving, by the low-energy node, a second selection-phase enhanced beacon from a second TSCH node;
   transmitting, by the low-energy node, a second adoption request to the second TSCH node; and
   receiving, by the low-energy node, a second adoption response from the second TSCH node indicating the second TSCH node is managing the low-energy node rejoining the primary TSCH network on behalf of the low-energy node.

7. The method of claim 6, further comprising:
   transmitting, by the low-energy node, an emancipation request to the first TSCH node requesting that the first TSCH node release the low-energy node; and
   receiving, by the low-energy node, an emancipation response from the first TSCH node.

8. A system comprising:
   a plurality of time-slotted channel hopping ("TSCH") nodes communicatively coupled to each other in a primary TSCH network; and
   a low-energy node comprising:
      a processor; and
      a non-transitory computer readable medium on which instructions are stored for causing the processor to:
         synchronize communications of the low-energy node with a channel hopping pattern of the primary TSCH network to synchronize a clock of the low-energy node with the primary TSCH network;
         after synchronizing the communications, transmit a selection-phase enhanced beacon request that requests an enhanced beacon from TSCH nodes of the plurality of TSCH nodes with availability to accept child nodes and with at least a specified link quality;

receive, a selection-phase enhanced beacon from a first TSCH node of the plurality of TSCH nodes;
transmit an adoption request to the first TSCH node requesting the first TSCH node to adopt the low-energy node as a child node; and
receive an adoption response from the first TSCH node indicating the first TSCH node agrees to adopt the low-energy node as a child node and is managing the primary TSCH network join on behalf of the low-energy node.

9. The system of claim 8, wherein the selection-phase enhanced beacon is a first selection-phase enhanced beacon, wherein the instructions further cause the processor to:
receive a second selection-phase enhanced beacon from a second TSCH node of the plurality of TSCH nodes;
compare link quality information from the first selection-phase enhanced beacon with link quality information from the second selection-phase enhanced beacon; and
when the comparison indicates that the first TSCH node provides better link quality than the second TSCH node, then select the first TSCH node as a parent node.

10. The system of claim 8, wherein causing the processor to synchronize communications with the channel hopping pattern of the primary TSCH network comprises:
transmitting a synchronization-phase enhanced beacon request on a low-energy network channel; and
receiving a synchronization-phase enhanced beacon including information for synchronizing communications with the channel hopping pattern of the primary TSCH network.

11. The system of claim 10, wherein causing the processor to synchronize communications with the channel hopping pattern of the primary TSCH network further comprises:
listening a predetermined amount of time for the synchronization-phase enhanced beacon; and
in response to not receiving the synchronization-phase enhanced beacon during the predetermined amount of time, transmitting another synchronization-phase enhanced beacon request.

12. The system of claim 8, wherein the instructions further cause the processor to:
wake the low-energy node from a sleep state; and
resynchronize communications by the low-energy node with the channel hopping pattern of the primary TSCH network.

13. The system of claim 12, wherein the selection-phase enhanced beacon request is a first selection-phase enhanced beacon request, the selection-phase enhanced beacon is a first selection-phase enhanced beacon, the adoption request is a first adoption request, and the adoption response is a first adoption response, wherein the instructions further cause the processor to:
transmit a second selection-phase enhanced beacon request that requests another enhanced beacon from the TSCH nodes with availability to accept children and with at least the specified link quality using the resynchronized communications;
receive a second selection-phase enhanced beacon from a second TSCH node;
transmit a second adoption request to the second TSCH node; and
receive a second adoption response from the second TSCH node indicating the second TSCH node is managing the low-energy node rejoining the primary TSCH network on behalf of the low-energy node.

14. The system of claim 13, wherein the instructions further cause the processor to:

transmit an emancipation request to the first TSCH node requesting that the first TSCH node release the low-energy node; and
receive an emancipation response from the first TSCH node.

15. A method comprising:
receiving, by a time-slotted channel hopping ("TSCH") node of a primary TSCH network, a selection-phase enhanced beacon request from a low-energy node during a TSCH timeslot in a parent selection phase;
transmitting, by the TSCH node, a selection-phase enhanced beacon based on determining that the TSCH node has availability to accept a child node and that the TSCH node has a link quality with the low-energy node that exceeds a threshold value indicated in the selection-phase enhanced beacon request;
receiving, by the TSCH node, an adoption request from the low-energy node requesting the TSCH node to adopt the low-energy node as a child node; and
transmitting, by the TSCH node, an adoption response to the low-energy node indicating the TSCH node agrees to adopt the low-energy node as a child node and is managing the low-energy node joining the primary TSCH network on behalf of the low-energy node.

16. The method of claim 15, wherein receiving the selection-phase enhanced beacon request comprises receiving the selection-phase enhanced beacon request during a primary portion of the TSCH timeslot indicating the low-energy node is synchronized with the primary TSCH network.

17. The method of claim 15, wherein prior to receiving the selection-phase enhanced beacon request during the parent selection phase, the method further comprises:
listening, by the TSCH node, during a primary portion of a TSCH timeslot for a communication from another TSCH node on the primary TSCH network;
when no communication is received during the primary portion of the TSCH timeslot, then listening, by the TSCH node, on a low-energy network channel during a secondary portion of the TSCH timeslot for a synchronization-phase enhanced beacon request from the low-energy node; and
transmitting, by the TSCH node, a synchronization-phase enhanced beacon for synchronizing communications between the low-energy node and the primary TSCH network in response to the synchronization-phase beacon enhanced beacon request.

18. The method of claim 17, wherein transmitting the synchronization-phase enhanced beacon comprises transmitting the synchronization-phase enhanced beacon during a primary portion of a second TSCH timeslot, the second TSCH timeslot subsequent to the TSCH timeslot.

19. The method of claim 15, wherein transmitting the selection-phase enhanced beacon comprises waiting for a random amount of time before transmitting the selection-phase enhanced beacon to avoid the selection-phase enhanced beacon colliding with another selection-phase enhanced beacon transmitted by another TSCH node on the primary TSCH network.

20. The method of claim 15, further comprising:
receiving, by the TSCH node, an emancipation request from the low-energy node requesting that the TSCH node release the low-energy node;
releasing, by the TSCH node, resources used by the TSCH node for managing the low-energy node; and transmitting, by the TSCH node, an emancipation response to the low-energy node.

* * * * *